(12) United States Patent
Kosyanchuk et al.

(10) Patent No.: US 9,966,741 B2
(45) Date of Patent: May 8, 2018

(54) INTEGRATED CONNECTOR FOR BACKPLANE OF A DRAW OUT BREAKER CHASSIS

(71) Applicant: SCHNEIDER ELECTRIC USA, INC., Andover, MA (US)

(72) Inventors: Elena Kosyanchuk, Cedar Rapids, IA (US); David W. Barenz, Solon, IA (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days. days.

(21) Appl. No.: 15/128,647

(22) PCT Filed: Mar. 31, 2014

(86) PCT No.: PCT/US2014/032315
§ 371 (c)(1),
(2) Date: Sep. 23, 2016

(87) PCT Pub. No.: WO2015/152861
PCT Pub. Date: Oct. 8, 2015

(65) Prior Publication Data
US 2017/0110858 A1 Apr. 20, 2017

(51) Int. Cl.
*H02B 1/21* (2006.01)
*H02B 11/04* (2006.01)
*H01H 71/08* (2006.01)
*H02B 11/173* (2006.01)

(52) U.S. Cl.
CPC ............ *H02B 11/04* (2013.01); *H01H 71/08* (2013.01); *H02B 1/21* (2013.01); *H02B 11/173* (2013.01)

(58) Field of Classification Search
CPC ... H02B 1/21; H02B 1/20; H02B 1/22; H02B 11/04; H02B 1/00; H02B 1/205; H02B 1/36; H01H 71/08; H01H 71/082; H01H 33/6661; H01H 9/104; H01H 1/20
See application file for complete search history.

(56) References Cited

U.S. PATENT DOCUMENTS 4,018,498 A 4/1977 Lascarrou
4,033,660 A * 7/1977 Ericson .................... H01H 1/62
439/262

(Continued)

OTHER PUBLICATIONS

International Search Report and Written Opinion dated Aug. 13, 2014 in PCT/US2014/032315, 12 pp.

(Continued)

*Primary Examiner* — Adam B Dravininkas
(74) *Attorney, Agent, or Firm* — Locke Lord LLP (57) ABSTRACT

A power connector (100) is provided for connecting a drawout circuit breaker to a conductive bus bar. The power connector (100) is formed as a unitary body having a first end and a second end opposite the first end. The first end has a circuit breaker terminal (310) to connect to the drawout circuit breaker through the clusters. The second end has a bus bar terminal (350) to connect to the conductive bus bar. The bus bar terminal (350) may have a pair of extending arms (352), which form a U-shape profile. A conductive bus bar can be connected between the pair of extending arms (352) on one or both sides to the bus bar terminal (350).

15 Claims, 8 Drawing Sheets

(56) References Cited

U.S. PATENT DOCUMENTS

| | | | | |
|---|---|---|---|---|
| 4,361,724 A | * | 11/1982 | Olashaw | H02B 1/21 174/129 B |
| 4,781,627 A | * | 11/1988 | Farag | H02G 5/08 439/687 |
| 4,845,589 A | | 7/1989 | Weidler et al. | |
| 5,157,584 A | * | 10/1992 | Rowe | H02B 1/21 174/129 B |
| 5,642,256 A | * | 6/1997 | Pugh | H02B 1/36 200/50.02 |
| 6,040,976 A | | 3/2000 | Bruner et al. | |
| 6,242,702 B1 | * | 6/2001 | Spiegel | H02B 11/02 200/296 |
| 6,603,075 B1 | * | 8/2003 | Soares | H02B 1/21 174/149 B |
| 8,197,289 B1 | * | 6/2012 | Faber | H01R 13/15 439/819 |
| 2002/0098745 A1 | * | 7/2002 | Triantopoulos | H01R 4/186 439/877 |
| 2003/0166353 A1 | | 9/2003 | Bach et al. | |
| 2004/0087221 A1 | | 5/2004 | Meiners et al. | |
| 2009/0080147 A1 | | 3/2009 | Kunkle et al. | |
| 2010/0304590 A1 | * | 12/2010 | Frassineti | H01H 1/58 439/196 |
| 2011/0149483 A1 | * | 6/2011 | Diaz | H02B 1/20 361/637 |
| 2012/0314340 A1 | * | 12/2012 | Faber | H01R 13/04 361/611 |

OTHER PUBLICATIONS

Masterpact NT and NW Catalogue 2011, "LV Power Circuit Breakers and Switch-Disconnectors", 172 pp.

Extended European Search Report for Application No. 14887898.6-1801 / 3127201 PCT/US2014032315 completed Sep. 27, 2017.

* cited by examiner

INTEGRATED CONNECTOR FOR BACKPLANE OF A DRAW OUT BREAKER CHASSIS

FIELD

The present disclosure relates to an integrated power connector for a drawout cradle for a circuit breaker.

BACKGROUND

Circuit breakers are commonly used to protect electrical equipment from overload and short circuit events. Large circuit breakers that carry thousands of amps of current are oftentimes installed into metal-enclosed switchgear assemblies. Switchgear assemblies have large electrical conductors called bus bars (or "buss bars") that carry current from a power source, such as a power utility, through the circuit breakers, to loads that are protected by the circuit breaker. These large circuit breakers, which can weigh hundreds of pounds, are typically lifted into the switchgear and racked by mounting the circuit breakers into a drawout (or draw out) circuit breaker cradle. A manually controlled or remotely operated mechanism is inserted into the cradle to turn a crank that racks the circuit breaker into the switchgear and completes an electrical circuit which is protected by the breaker.

A known switchgear assembly typically comprises a cabinet of three sections: a cable section, a bus section and a breaker or equipment section. The breaker section houses a drawout circuit breaker cradle, which simplifies mounting and dismounting of a circuit breaker from field serviceable connections, allowing for ease of installation, removal, and maintenance. The drawout circuit breaker cradle includes a carriage assembly (or chassis) for receiving and supporting a circuit breaker and moving it into or out of the breaker section to make or break contact with the turnable joint mounts (TJMs) bolted at a first end to the bus bar terminals. The TJMs have a second end with a double prong U-shape profile facing towards the breaker. At the rear end of the breaker section/cradle may be a backmold (e.g., a backplane), which is a dielectric barrier between the breaker and bus sections with the double pronged U-shape profile of the TJMs protruding through. The breaker, which translates back and forth on the carriage, has "clusters" (e.g., spring-tensioned double-sided finger connectors) at the rear thereof, i.e. facing the backmold. All of these electrical/mechanical connections, however, reduce conduction efficiency, produce heat and thus, further reduce the current carrying capacity (e.g., ampacity), requiring larger conductors and more material expense.

SUMMARY

A power connector of the present invention providing the link between a bus bar and a circuit breaker cluster connection, such as for use in a drawout circuit breaker cradle, integrates a bus bar terminal and a TJM without a bolted connection therebetween. The power connector thus reduces the number of mechanical connections, such as bolted joints, which are typically used. A power connector of the present invention provides a separate bus bar terminal on a first end and a circuit breaker terminal on a second end in a one piece construction. As a consequence, the power connector provides improved heat conduction efficiency, and thus, improved current carrying capacity over conventional connection assemblies. Furthermore, in comparison to conventional connection assemblies, the unitary construction can utilize less material to interconnect a drawout circuit breaker to a bus bar, without having to reduce the current carrying capacity.

In a further embodiment, the power connector can incorporate an improved bus bar terminal design that includes a pair of extending arms, which form a U-shape profile. A conductive bus bar can be connected between the pair of extending arms of the bus bar terminal, such as by using fasteners (e.g., bolts or screws). The U-shape profile for the bus bar terminal takes into consideration skin and proximity effects as well as heat conduction (e.g., such as by increasing surface area). Accordingly, the U-shape profile improves heat dissipation and reduces power losses (e.g., ohmic losses) in comparison to T-shape and L-shape profiles of bus bar terminals.

BRIEF DESCRIPTION OF THE DRAWINGS

The description of the various exemplary embodiments is explained in conjunction with the appended drawings, in which.

DETAILED DESCRIPTION

Figure 1:
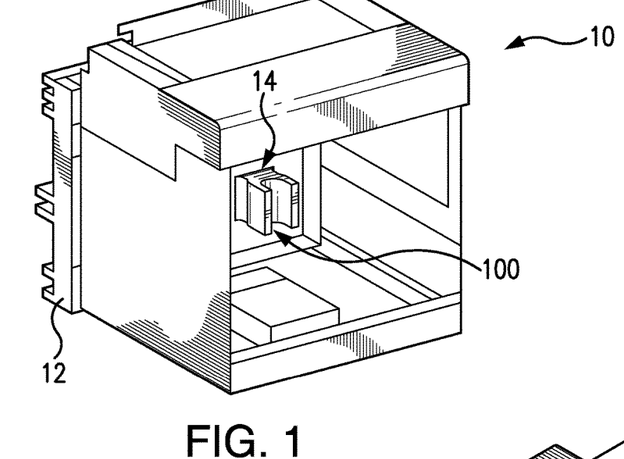
FIG. 1 illustrates a perspective frontal view of a cradle for a drawout circuit breaker with a plurality of power connecters arranged in a backmold of the cradle, in accordance with a first embodiment.
Figures 2, 3:
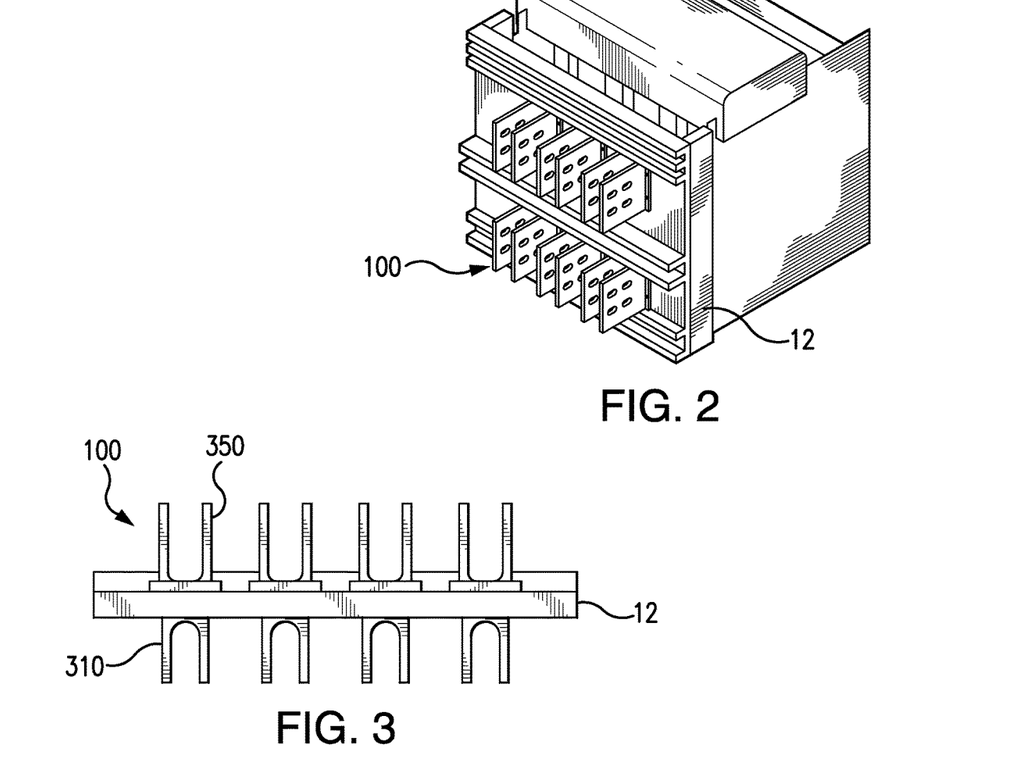
FIG. 2 illustrates a perspective back view of the drawout circuit breaker cradle of FIG. 1.
FIG. 3 illustrates a top partial view of a plurality of power connectors arranged through a backmold of the drawout circuit breaker cradle of FIG. 1.

Referring to FIGS. 1 and 2, there is shown a drawout circuit breaker cradle 10, such as for use in a switchgear cabinet. The cradle 10 includes a carriage assembly for receiving and supporting a drawout circuit breaker (not shown). The cradle 10 has a front end with an opening through which to receive a circuit breaker, and a backend having a backmold 12 (e.g., a backplane) which is formed of a dielectric material. The backmold 12 separates bus bars from the circuit breaker, and includes a plurality of openings 14 for mounting one or more power connectors 100 to the backmold 12. In this example, there are six power connectors 100 arranged in corresponding openings 14 of the backmold 12. As shown in FIG. 3, each power connector 100 is formed as a unitary body having a first end with a circuit breaker terminal 310 and a second end (opposite the first end) with a bus bar terminal 350. The circuit breaker terminal 310 connects to a circuit breaker, such as via a corresponding cluster that is engaged to a conductive stab (e.g., a cluster support or pivot) of the circuit breaker, when the circuit breaker is racked into the cradle 10. The bus bar terminal 350 connects to a conductive bus bar(s). The cradle 10 may also include a shutter system (not shown) to protect an operator or technician from contacting the circuit breaker terminal(s) 310 of the power connector(s) 100 located at a back interior end of the cradle 10, such as shown in FIG. 1.

Figure 4:
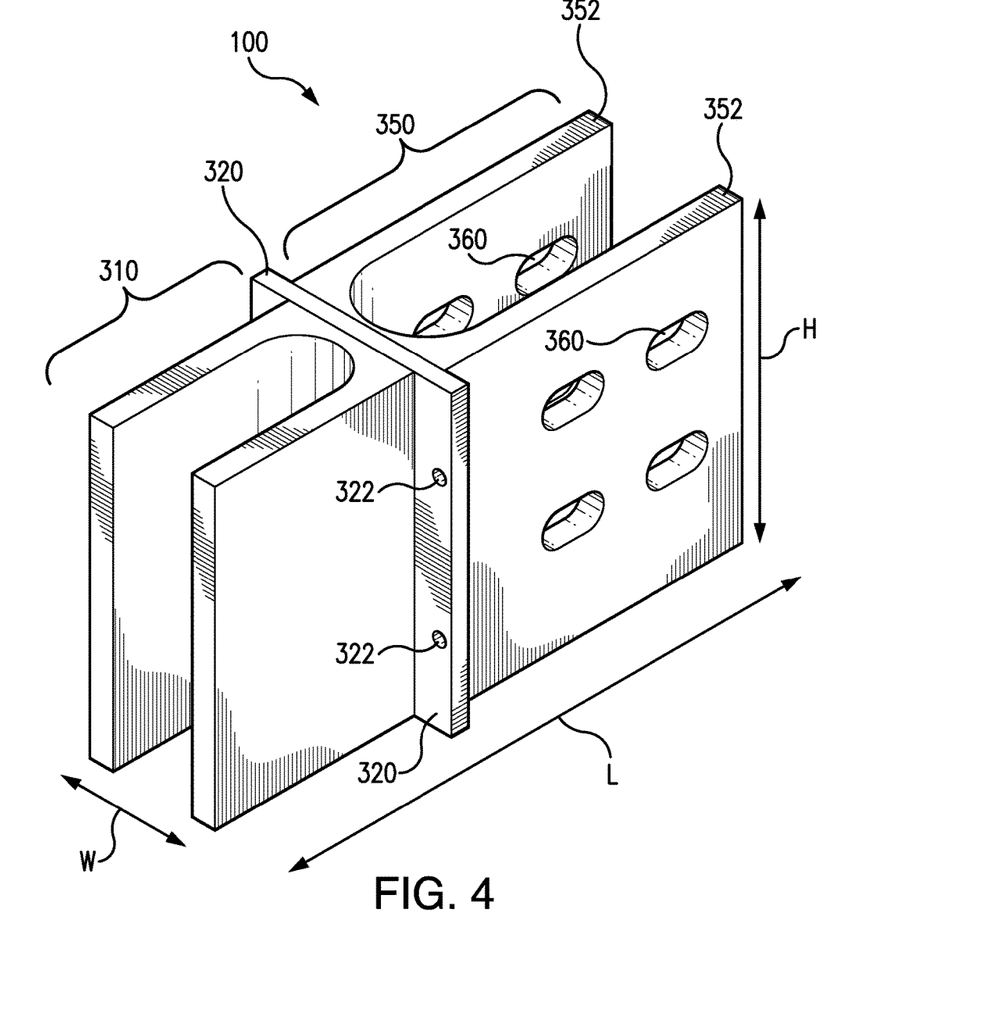
FIG. 4 illustrates a perspective view of one of the power connectors of FIG. 1, in accordance with the first embodiment.

FIG. 4 illustrates an enlarged perspective view of the power connector 100 with the integrated circuit breaker terminal 310 and bus bar terminal 350, in accordance with a first embodiment. The bus bar terminal 350 includes a pair of extending arms 352, which forms a U-shape profile. Each extending arm 352 may include a plurality of holes 360. A conductive bus bar(s) can be connected between the pair of extending arms 352 of the bus bar terminal 350. For example, a conductive bus bars can be fastened to either of the appropriately oriented extending arms 352, via the holes 360 using bolts or screws. The circuit breaker terminal 350 also has a standard U-shape profile for receiving circuit breaker cluster connections. Furthermore, the power connector 100 includes extending side portions 320, which have mounting holes 322. The power connector 100 can be connected to the backmold 12 of the cradle 10 (see e.g., FIG. 2), via the mounting holes 322 using bolts or screws.

As indicated, the power connector 100 has a length (L) defined by a longitudinal axis from the first end to the second end of the unitary body, a height (H) defined by a vertical axis perpendicular to the longitudinal axis from the first end to the second end, and a width (W) normal to the length and height defined by a distance from one side of the power connector body to the opposite side. In this embodiment, the circuit breaker terminal 310 has a smaller length and width than the bus bar terminal 350, but has the same height as the bus bar terminal 350.

Figure 5:
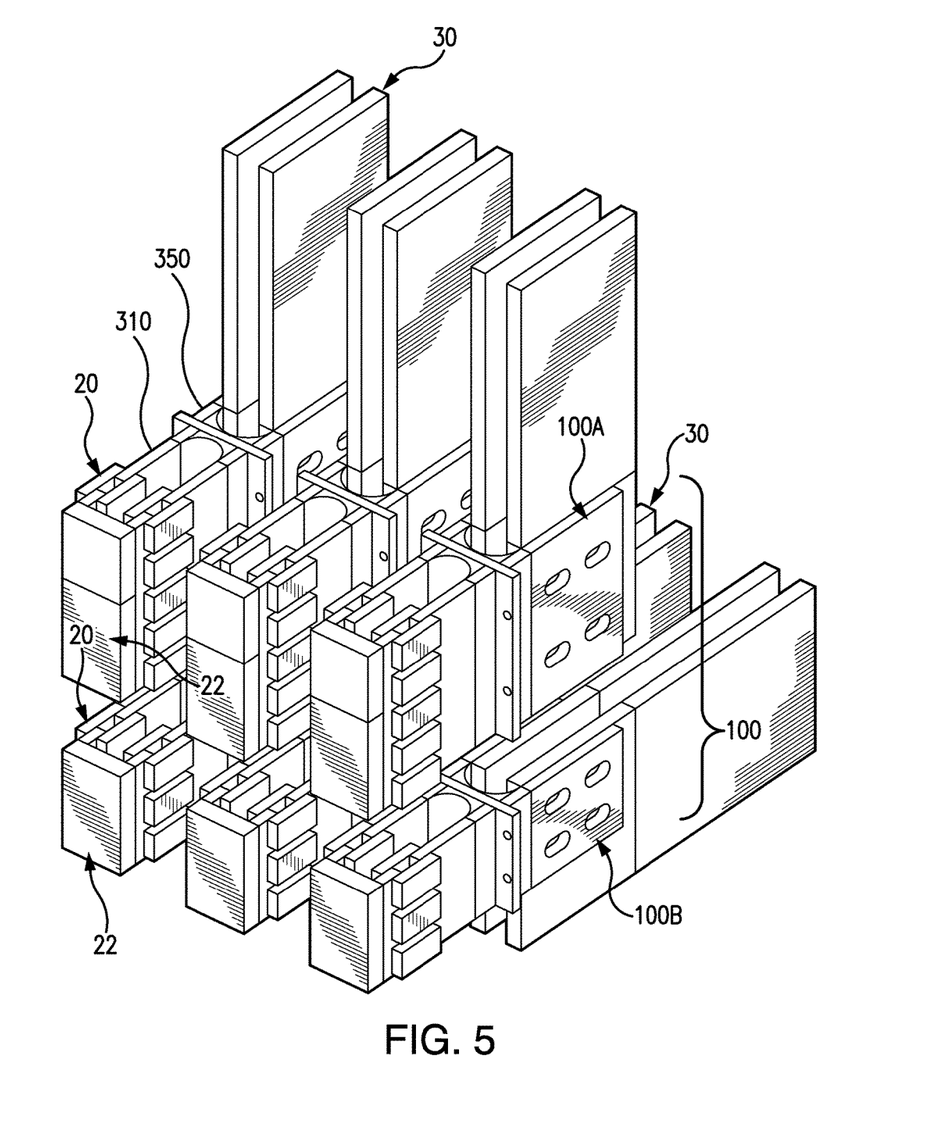
FIG. 5 illustrates a perspective view of the plurality of power connectors of FIGS. 1 and 2 (without the cradle) connected on their first ends to respective clusters of a circuit breaker and on their second ends to conductive bus bars.

FIG. 5 illustrates a perspective view of the plurality of power connectors 100 of FIGS. 1 and 2 (without the cradle 10 and its backmold 12), which are connected on their first ends to respective clusters 20 of a circuit breaker (with only the breaker stabs 22 indicated) and on their second ends to conductive bus bars 30. For example, each power connector 100 has the circuit breaker terminal 310 connected to a cluster 20, and the bus bar terminal 350 connected to a bus bars 30. As shown in the example of FIG. 5, the top row of power connectors 100A may have a greater height than the bottom row of power connectors 100B. Accordingly, power connectors of different dimensions may be used with a drawout circuit breaker cradle, such as shown in FIGS. 1 and 2, depending on the application, the electrical requirements, the configuration of the bus bar system (e.g., the type, size and orientation of the bus bars), and the configuration of the circuit breaker (e.g., the type and size of the clusters).

Figure 6A:
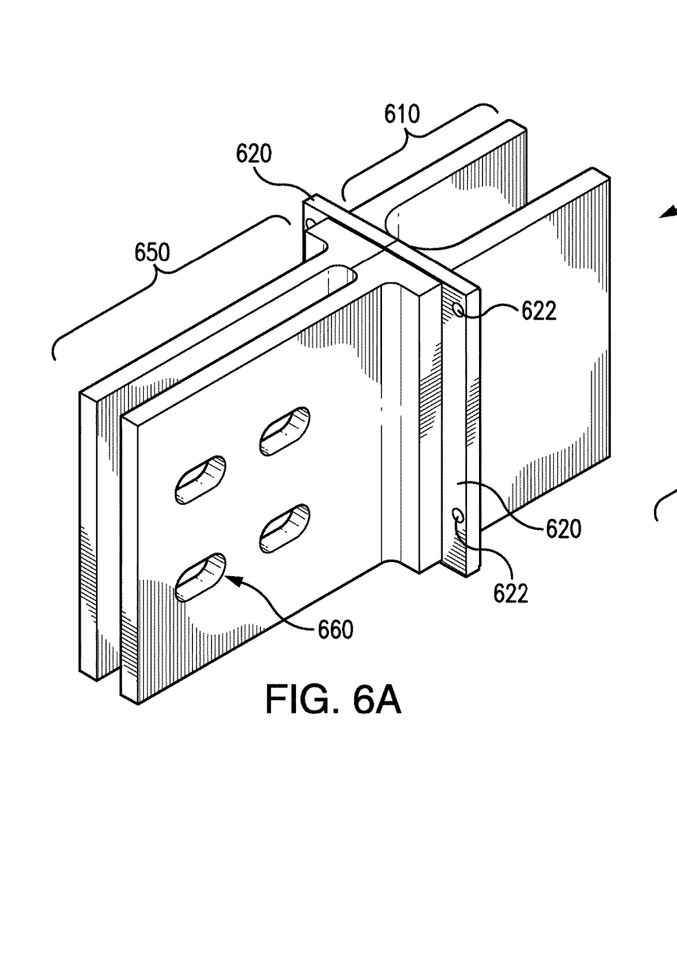
FIGS. 6A and 6B illustrate perspective views of a power connector for a drawout circuit breaker cradle, such as in FIG. 1, in accordance with a second embodiment.
Figure 6B:
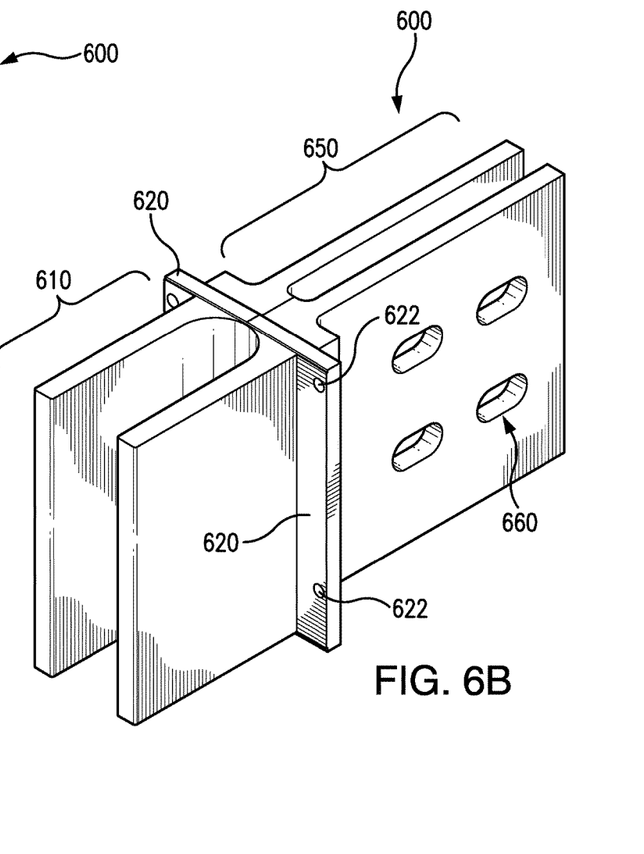

FIGS. 6A and 6B illustrate perspective views of a power connector 600 for a drawout circuit breaker cradle, such as the cradle 10 in FIGS. 1 and 2, in accordance with a second embodiment. As with the power connector 100 in the first embodiment in FIG. 4, the power connector 600 is formed as a unitary body having a first end with a circuit breaker terminal 610 and a second end (opposite the first end) with a bus bar terminal 650. The power connector 600 also includes extending side portions 620 on each side. Each extending side portion 620 has one or more mounting holes 622 for fastening the power connector 600 to a backmold of a drawout circuit breaker cradle, such as in FIGS. 1 and 2, using bolts or screws. The bus bar terminal 650 has a pair of extending arms with a narrow U-shape profile, and holes 660 for fastening a bus bar therebetween using bolts or screws. The circuit breaker terminal 610 also has a standard U-shape profile. In the second embodiment, the circuit breaker terminal 610 has a greater width but smaller length than the bus bar terminal 650.

Figure 7:
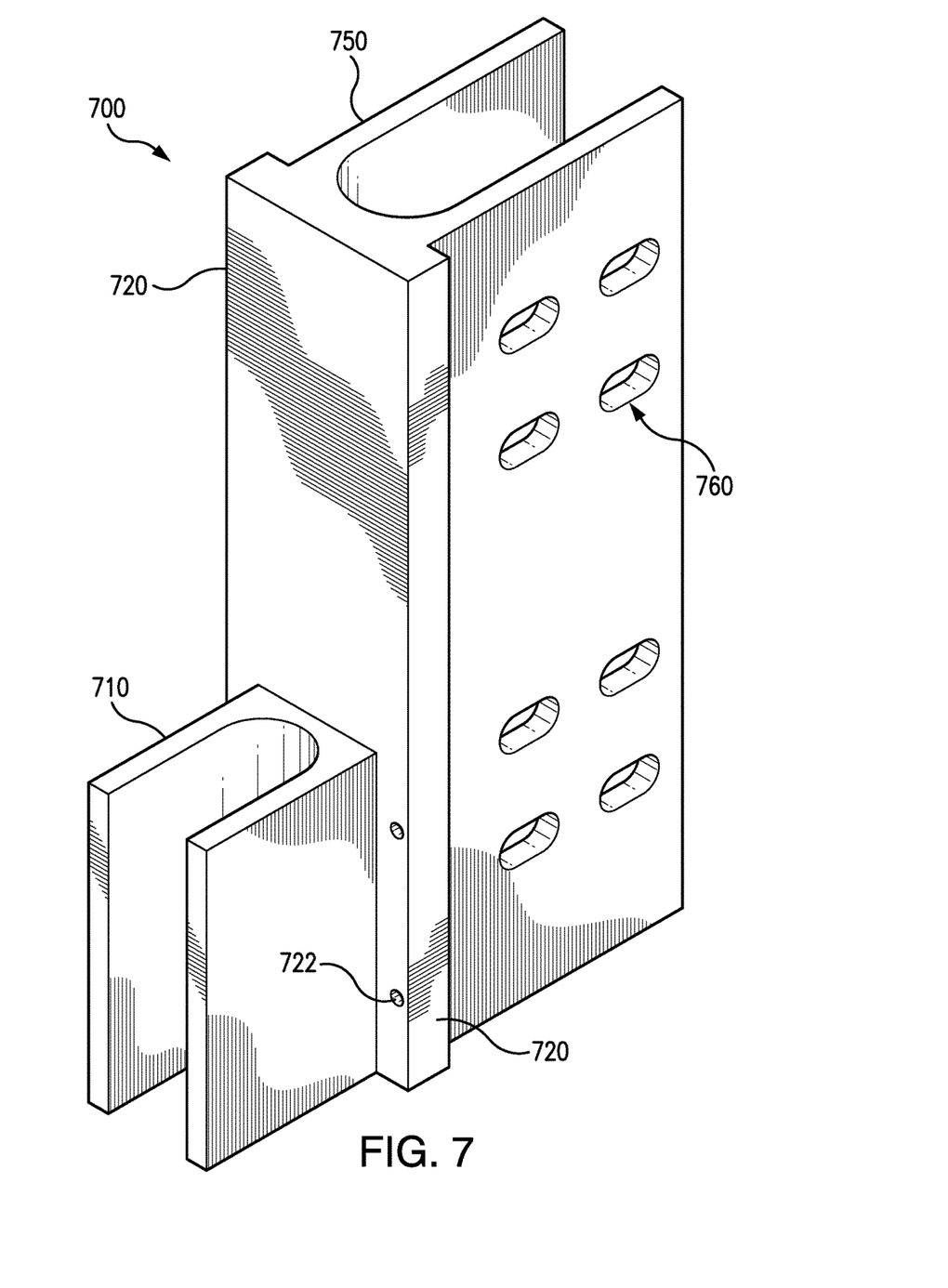
FIG. 7 illustrates a perspective view of a power connector for a drawout circuit breaker cradle, such as in FIG. 1, in accordance with a third embodiment.

FIG. 7 illustrates a perspective view of a power connector 700 for a drawout circuit breaker cradle, such as the cradle 10 in FIGS. 1 and 2, in accordance with a third embodiment. As with the power connector 100 in the first embodiment in FIG. 4, the power connector 700 is formed as a unitary body that includes a circuit breaker terminal 710 on a first end, a bus bar terminal 750 on a second end which is opposite the first end, and extending side portions 720 with mounting holes 722 for fastening the power connector 700 to a backmold of a drawout circuit breaker cradle, such as in FIGS. 1 and 2, using bolts and screws. The bus bar terminal 750 has a pair of extending arms with a U-shape profile, and holes 760 for fastening bus bar(s) thereto using bolts or screws. The circuit breaker terminal 710 also has a U-shape profile. In the third embodiment, the circuit breaker terminal 710 has a smaller length and much smaller height than the bus bar terminal 750, whose vertical surface area is increased dramatically. Furthermore, the extending side portions 720 continue to extend vertically along with the bus bar terminal 750.

Figure 8:
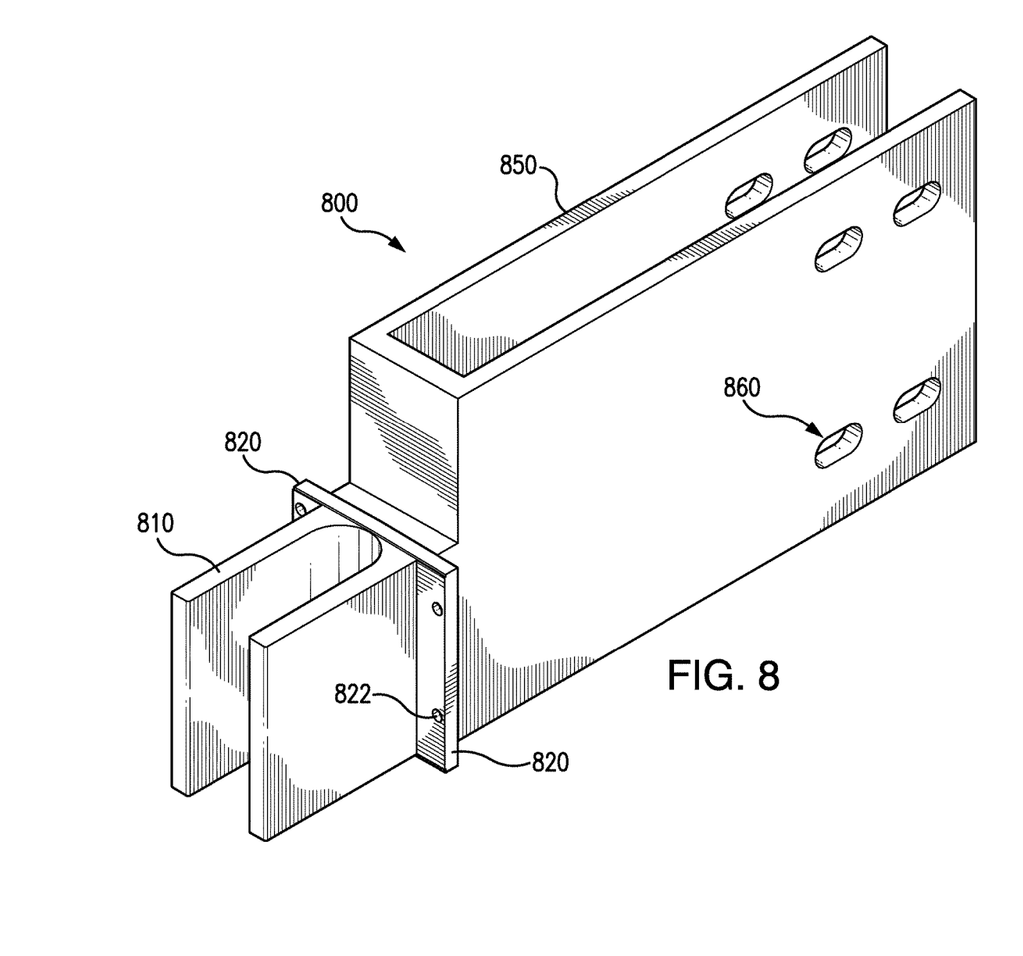
FIG. 8 illustrates a perspective view of a power connector for a drawout circuit breaker cradle, such as in FIG. 1, in accordance with a fourth embodiment.

FIG. 8 illustrates a perspective view of a power connector 800 for a drawout circuit breaker cradle, such as in FIGS. 1 and 2, in accordance with a fourth embodiment. As with the power connector 100 in the first embodiment in FIG. 4, the power connector 800 is formed as a unitary body that includes circuit breaker terminal 810 on a first end, a bus bar terminal 850 on a second end which is opposite the first end, and extending side portions 820. The side portions 820 have mounting holes 822 for fastening the power connector 800 to a backmold of a drawout circuit breaker cradle, such as in FIGS. 1 and 2, using bolts and screws. The bus bar terminal 850 has a pair of extending arms with a U-shape profile, and holes 860 for fastening bus bar(s) thereto using bolts or screws. The circuit breaker terminal 810 also has a U-shape profile. In the fourth embodiment, the circuit breaker terminal 810 has a smaller length and height, and much smaller length than the bus bar terminal 850 whose vertical surface area is increased dramatically. Furthermore, the extending side portions 820 extend vertically along with the circuit breaker terminal 810.

Figure 9:
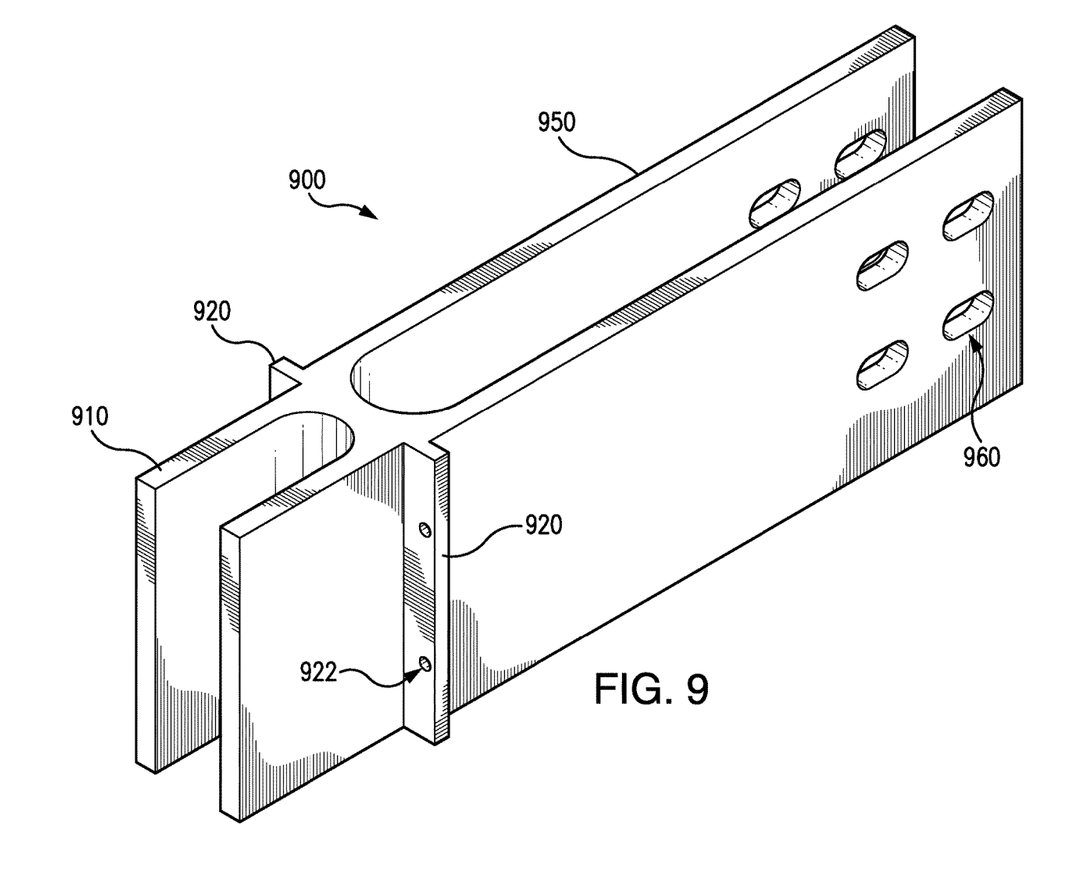
FIG. 9 illustrates a perspective view of a power connector for a drawout circuit breaker cradle, such as in FIG. 1, in accordance with a fifth embodiment.

FIG. 9 illustrates a perspective view of a power connector 900 for a drawout circuit breaker cradle, such as in FIGS. 1 and 2, in accordance with a fifth embodiment. As with the power connector 100 in the first embodiment in FIG. 4, the power connector 900 is formed as a unitary body that includes circuit breaker terminal 910 on a first end, a bus bar terminal 950 on a second end opposite the first end, and extending side portions 920 with mounting holes 922. The mounting holes 922 are used to fasten the power connector 900 to a backmold of a drawout circuit breaker cradle, such as in FIGS. 1 and 2, using bolts and screws. The bus bar terminal 950 has a pair of extending arms with a U-shape profile, and holes 960 for fastening bus bar(s) thereto using bolts or screws. The circuit breaker terminal 910 also has a U-shape profile. In the fifth embodiment, the circuit breaker terminal 910 has a length which is at least more than two or three times smaller than that of the bus bar terminal 950, and has a height which is the same as the bus bar terminal 950.

Figure 10:
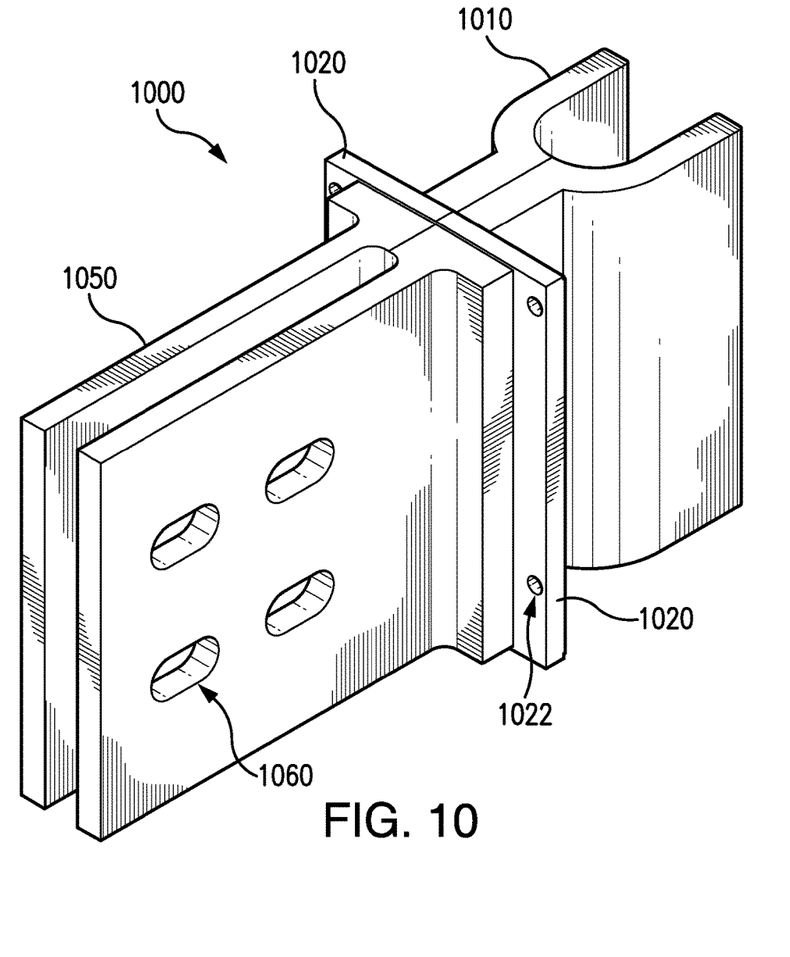
FIG. 10 illustrates a perspective view of a power connector for a drawout circuit breaker cradle, such as in FIG. 1, in accordance with a sixth embodiment.

FIG. 10 illustrates a perspective view of a power connector 1000 for a drawout circuit breaker cradle, such as in FIGS. 1 and 2, in accordance with a sixth embodiment. As with the power connector 100 in the first embodiment in FIG. 4, the power connector 1000 is formed as a unitary body that includes circuit breaker terminal 1010 on a first end, a bus bar terminal 1050 on a second end opposite the first end, and extending side portions 1020. The side portions 1020 have holes 1022 for fastening the power connector 1000 to a backmold of a drawout circuit breaker cradle, such as in FIGS. 1 and 2, using bolts and screws. The bus bar terminal 1050 has a pair of extending arms with a narrow U-shape profile for surrounding a single bus bar, and holes 1060 for fastening a bus bar thereto using bolts or screws. The circuit breaker terminal 1010 also has a typical U-shape profile (e.g., a fork-shaped head with two prongs) for receiving the circuit breaker clusters (e.g. 20, FIG. 5). In the sixth embodiment, the circuit breaker terminal 1010 has a smaller length but a larger width than the bus bar terminal 1050.

The illustrated embodiments of the power connectors are simply provided as examples. The bus bar terminal and the circuit breaker terminal of the power connector may be designed in various sizes and shapes, depending on the application such as the configuration or layout of the bus bars in the switchgear cabinet and the ampacity requirements of the system. The middle portion of the power connector between the circuit breaker terminal and the bus bar terminal may be designed with a dimension (e.g., size and shape) to properly fit within the dimensions of a cradle backmold and its openings and supports for the power connectors. The power connector may be formed by any desirable method, and may be made from a conductive material, such as copper, aluminum or any suitable conductive material or composition of materials depending on the application and the desired electrical specifications.

Although the bus bar terminal of the power connector in the various embodiments is shown as having a U-shape profile, it may be designed with any suitable profile to enable connection of bus bars thereto. Likewise, if the cluster arrangements are nonstandard, the circuit breaker terminal may be differently shaped. Furthermore, the power connectors can be fastened to the backmold of the cradle using fastening systems other than bolts or screws.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the invention as defined in the appended claims.

The invention claimed is:

1. A power connector for interconnecting a drawout circuit breaker to a conductive bus bar, the power connector comprising:
    a unitary body having a first end and a second end opposite the first end, the first end having a circuit breaker terminal to connect to the drawout circuit breaker, the second end having a bus bar terminal to connect to the conductive bus bar,
    wherein the bus bar terminal includes a pair of extending arms having a space therebetween to receive the conductive bus bar, and
    wherein each of the pair of extending arms includes one or more holes on a side of the arm through which to fasten a portion of the bus bar arranged between the extending arms using a fastener.

2. The power connector of claim 1, wherein the bus bar terminal has a U-shape profile.

3. The power connector of claim 2, wherein the circuit breaker terminal has a U-shape profile.

4. The power connector of claim 1, wherein the bus bar terminal has a length greater than a length of the circuit breaker terminal along a longitudinal axis from the first end to the second end of the unitary body.

5. The power connector of claim 1, wherein the bus bar terminal has a height greater than a height of the circuit breaker terminal along an axis perpendicular to a longitudinal axis from the first end to the second end of the unitary body.

6. The power connector of claim 1, wherein the bus bar terminal is configured to make direct physical contact with the bus bar.

7. The power connector of claim 1, wherein the unitary body further includes extending side portions that include holes through which to mount the unitary body to a cradle of the drawout circuit breaker using a fastener.

8. A drawout circuit breaker assembly, comprising:
    a cradle to receive a drawout circuit breaker, the cradle including a backmold having an opening; and
        a power connector, arranged in the backmold through the opening, to interconnect the drawout circuit breaker to a conductive bus bar, the power connector comprising:
        a unitary body of conductive material having a first end and a second end opposite the first end, the first end having a circuit breaker terminal to connect to the drawout circuit breaker inside the cradle, the second end having a bus bar terminal to physically connect directly to the conductive bus bar outside the cradle,
        wherein the bus bar terminal includes a pair of extending arms having a space therebetween to receive the conductive bus bar, and
        wherein each of the pair of extending arms includes one or more holes on a side of the arm through which to fasten a portion of the bus bar arranged between the extending arms using a fastener.

9. The drawout circuit breaker assembly of claim 8, wherein the bus bar terminal has a U-shape profile.

10. The drawout circuit breaker assembly of claim 9, wherein the circuit breaker terminal has a U-shape profile.

11. The drawout circuit breaker assembly of claim 8, wherein the bus bar terminal has a length greater than a length of the circuit breaker terminal along a longitudinal axis from the first end to the second end of the unitary body.

12. The drawout circuit breaker assembly of claim 8, wherein the bus bar terminal has a height greater than a height of the circuit breaker terminal along an axis perpendicular to a longitudinal axis from the first end to the second end of the unitary body.

13. The drawout circuit breaker assembly of claim 8, wherein a plurality of the power connectors are arranged in the backmold.

14. The drawout circuit breaker assembly of claim 8, wherein the bus bar terminal is configured to make direct physical contact with the bus bar.

15. The drawout circuit breaker assembly of claim 8, wherein the unitary body further includes extending side portions that include holes through which to mount the unitary body to a cradle of the drawout circuit breaker using a fastener.

* * * * *